Figures 1, 2:
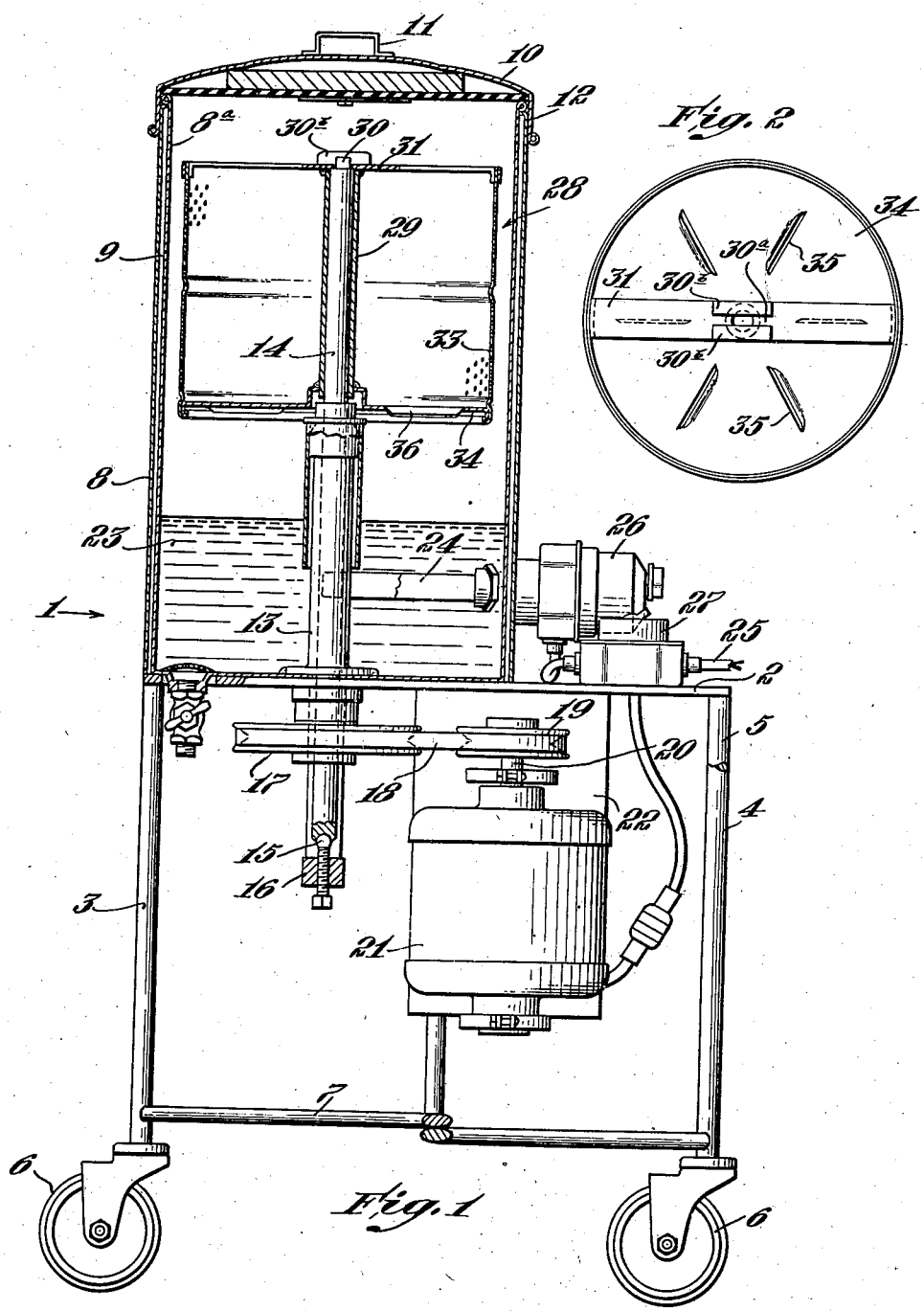

Aug. 14, 1945. J. H. EMERSON 2,381,974
METHOD OF PREPARING COMPRESSES
Filed Jan. 26, 19.

Inventor
John H. Emerson
by Roberts, Cushman & Woodberry
Attys.

Patented Aug. 14, 1945

2,381,974

UNITED STATES PATENT OFFICE 2,381,974

METHOD OF PREPARING COMPRESSES

John H. Emerson, Cambridge, Mass.

Application January 26, 1943, Serial No. 473,611

4 Claims. (Cl. 34—8)

This invention pertains to a method of use in the preparation of hot compresses for therapeutic use. In the treatment of various pathological conditions, especially in the more recently developed therapy for the alleviation or cure of infantile paralysis, it is necessary to apply hot moist compresses to the patient's body and continuously to replace the compresses with fresh ones as those earlier applied cool to an ineffective temperature. Commonly these compresses are prepared by dipping the folded pad of cloth into boiling water and wringing out the excess water by the use of a clothes wringer, before they are applied. Compresses thus prepared are at a reasonably uniform temperature such that they may be handled by the attendant and such that they do not actually burn the patient when applied and although the wringer removes water to the extent that they do not drip, they do contain the requisite moisture for effective use. However such mode of preparing compresses is troublesome as it necessitates the maintenance in or closely adjacent to the sick room of heating means for a vessel of hot water of sufficient capacity to permit introduction and removal of the compress pads, a wringer and a support for the latter, and the constant presence of an attendant. No matter how carefully the work be done, water is always dripping or spilling on the floor, the attendant's hands may be burned in removing the compresses from the boiling water, and in general the procedure is crude and arduous and the apparatus employed is cumbersome and occupies much space.

On the other hand steam sterilizers of the type employed for surgical use are not desirable in the preparation of moist compresses, in particular because they deliver the compresses too hot for handling or application thus making it necessary that they be laid aside to cool until, by guess, they are at the proper temperature for application.

A principal object of the present invention is to provide a novel and useful method of preparing such hot compresses and a novel apparatus useful in the practice of such method. A further object is to provide a method of providing hot compresses such that no handling of the compress is necessary until it is ready for application; to provide a method such that the compress is delivered at a substantially uniform predetermined and desirable temperature and contains the desired degree of moisture.

Other and further objects and advantages of the invention will be pointed out in the following detailed description and by reference to the accompanying drawing wherein Fig. 1 is a side elevation, partly in vertical section and with certain parts broken away, illustrating one desirable form of apparatus embodying the invention and by means of which the method may readily be performed; and Fig. 2 is a top plan view of the basket which holds the compress pads while they are being heated and moistened.

Referring to the drawing the numeral 1 designates the preferred apparatus as a whole, such apparatus preferably, although not necessarily, comprising a table 2 mounted upon spaced vertical legs 3, 4 and 5 each of which is provided at its lower end with a wheel swivel-caster 6 facilitating the ready movement of the apparatus from place to place. The legs 3, 4 and 5 are united and braced near their lower ends by means of horizontal connecting bars 7.

On the table 2 there is mounted a cylindrical housing or casing 8, preferably comprising an inner cylindrical member 8$^a$ spaced from the outer shell of the casing to provide an insulating space 9 which may contain any desired insulating material either solid or gaseous. A removable cover 10, preferably of insulating construction and having a handle 11, is designed to close the upper end of the casing or housing 8, preferably having a depending marginal flange 12 which fits snugly about the upper end of the casing.

Within the lower part of the casing and preferably extending upwardly to a distance approximating one-half the height of the casing is an elongate tubular bearing 13 which is rigidly secured to the bottom of the casing, for example by welding. This bearing receives a vertical, rotary shaft 14 which projects down through an opening in the bottom of the casing and whose lower end is supported upon an adjustable step bearing 15 carried by a bracket 16 depending from the underside of the table 2. A pulley 17 is secured to this lower part of the shaft 14 and receives a driving belt 18 which embraces a pulley 19 on the shaft 20 of an electric motor 21 mounted in a bracket 22 suspended from the table 2.

The lower portion of the housing or casing 8 defines a boiler chamber 23 for the reception of a body of water, and within this chamber 23 is arranged a heating unit 24 which receives electric current from a suitable source 25, the current preferably being controlled by a switch and rheostat 26 capable of supplying current at different intensity to the heating unit 24. From the same source 25, current may be supplied to the motor 21 through a switch 27.

Mounted upon the upper end of the spindle 14 is a basket 28, preferably made of sheet material, for instance tinned copper or from a moulded plastic such as synthetic resin. This basket comprises an axially arranged sleeve member 29 open at its lower end and of a diameter to telescope over the upper portion of the spindle 14. At its upper end the spindle 14 is provided with a driving boss 30 of polygonal shape, preferably rectangular, which is received in a slot 30ª defined by the parallel spaced inner edges of a pair of blocks 30ᵇ secured at opposite sides of an aperture in a cross bar 31 extending diametrically across the top of the basket 28. When the driving boss 30 is disposed in the slot 30ª, the basket is suspended upon the spindle and is coupled to the spindle so as to partake of the rotary movement of the latter. Except for the bar 31, the basket is open at its top thus making it easy to introduce compress pads into the basket and to remove them therefrom. The cylindrical side wall 33 of the basket is of perforated material or, if preferred, of a stiff open mesh woven fabric, while the otherwise imperforate bottom wall 34 is provided with a series of slots 35, preferably disposed generally radially, each having associated with it a downwardly directed fan blade 36. These fan blades are so arranged that when the basket is rotated by the motor, the blades tend to create an upward draft from the chamber 23 into the interior of the basket.

In using this device, the operator places water in the chamber 23, the water level being kept below the bottom 34 of the basket. The heating unit 24 is then energized and the water thus raised to the boiling point. The compress pads are placed within the basket 28, preferably so that they contact the side wall 33 of the basket thus approximating circular arcs. The cover is then placed on the container and the motor is started, thus rotating the basket at high speed. The space immediately below the bottom of the basket is filled with steam substantially at atmospheric pressure, and this steam is drawn upwardly into the basket by the fan blades 36. Due to the centrifugal action, this steam is rapidly expelled through the compress pads and outwardly through the perforations in the wall 33 of the basket. Some of this steam is condensed in passing through the compresses thus supplying moisture to the latter, and some of it may pass completely through the wall of the basket into the space surrounding the latter and if not condensed will be recirculated by the fans 36.

Since little pressure is developed within the apparatus, the water boils substantially at atmospheric pressure and at a substantially constant temperature, and thus as the motor turns at a substantially constant speed, the heat imparted to the compresses is substantially uniform. Likewise under these uniform temperature and pressure conditions, the amount of moisture taken up by the compresses will be substantially uniform. When the operation has continued for a sufficient length of time, which experiment has shown to be of the order of one minute, the motor may be stopped, the cover 10 removed and the hot compresses may then be lifted from the basket for direct application to the patient. While these compresses are properly moistened they do not drip when lifted from the basket and since all of the water employed is contained within the casing 8, there is no danger of spilling or slopping water onto the floor or onto the bed. Thus the apparatus may be used if desired in close proximity to the bed of the patient. Moreover the attendant is not required to lift the compresses from a body of boiling water so that there is but slight danger of burning his hands and no necessity for him to express water from the compresses before applying them. Furthermore, if several pads be placed within the basket at the same time and all treated simultaneously, those not immediately required for use may be left in the basket with the cover 10 in place for a substantial time without appreciable change in temperature or in moisture content. Thus the attendant may prepare a supply of compresses at infrequent intervals and use them one by one as required and without necessarily operating the apparatus each time a compress is called for.

While the apparatus and method have herein been particularly described with reference to the preparation of hot compresses at a moderate temperature, it is obviously possible, if desired, to produce very hot compresses by so modifying the container 8 as to permit the development of high pressure steam or vapor therein. Likewise, cold compresses may be produced by creating in chamber 23 a refrigerant atmosphere (at below atmospheric pressure if desired) comprising for example water vapor and/or gas.

While one desirable embodiment of the invention is here illustrated by way of example it is to be understood that the invention is not necessarily limited to this precise arrangement but is to be regarded as broadly inclusive of any and all equivalent constructions such as fall within the terms of the appended claims.

I claim:

1. Method of preparing compresses for therapeutic use which comprises as steps providing moist vapor at substantially atmospheric pressure revolving a compress pad in a circular path, and concomitantly centrifugally expelling said moist vapor radially out through the pad thereby to impart to the pad a substantially uniform predetermined temperature and moisture content.

2. Method of preparing hot compresses for therapeutic use which comprises as steps providing saturated steam at substantially atmospheric pressure and centrifugally forcing said steam through a compress pad thereby simultaneously to heat and moisten the compress.

3. Method of preparing hot compresses for therapeutic use which comprises as steps disposing the compress pad in a rotary container, rotating the container, providing saturated steam at substantially atmospheric pressure and centrifugally projecting said steam through the compress in a direction substantially radial with respect to the axis of rotation of the container thereby simultaneously to heat and moisten it.

4. Method of preparing hot compresses for therapeutic use which comprises as steps rapidly revolving the compress in a circular path, so heating a body of water to boiling point as to provide steam at substantially atmospheric pressure, admitting the steam to the center of said circular path, and expelling the steam centrifugally through the compress from its inner to its outer sides, thereby simultaneously to heat and moisten the compress.

JOHN H. EMERSON.